(12) United States Patent
Smith

(10) Patent No.: US 11,724,556 B2
(45) Date of Patent: Aug. 15, 2023

(54) MODIFIED CONTROL OF VARIABLE SHOCK ABSORBERS

(71) Applicant: Justin Smith, Wittmann, AZ (US)

(72) Inventor: Justin Smith, Wittmann, AZ (US)

(73) Assignee: Shock Therapy Suspension, Inc., Duluth, GA (US)

(*) Notice: Subject to any disclaimer, the term of this patent is extended or adjusted under 35 U.S.C. 154(b) by 0 days.

(21) Appl. No.: 17/694,937

(22) Filed: Mar. 15, 2022

(65) Prior Publication Data

US 2022/0288990 A1  Sep. 15, 2022

Related U.S. Application Data

(60) Provisional application No. 63/161,071, filed on Mar. 15, 2021.

(51) Int. Cl.
*B60G 17/019* (2006.01)
*B60G 17/016* (2006.01)

(52) U.S. Cl.
CPC ......... *B60G 17/019* (2013.01); *B60G 17/016* (2013.01); *B60G 2204/422* (2013.01); *B60G 2204/62* (2013.01); *B60G 2400/25* (2013.01); *B60G 2401/00* (2013.01); *B60G 2401/12* (2013.01); *B60G 2500/104* (2013.01); *B60G 2500/30* (2013.01); *B60G 2600/182* (2013.01); *B60G 2800/162* (2013.01); *B60G 2800/914* (2013.01); *B60G 2800/916* (2013.01)

(58) Field of Classification Search
CPC ............... B60G 17/019; B60G 17/016; B60G 2204/422; B60G 2204/62; B60G 2400/25; B60G 2401/00; B60G 2401/12; B60G 2500/104; B60G 2500/30; B60G 2600/182; B60G 2800/162; B60G 2800/914; B60G 2800/916
See application file for complete search history.

(56) References Cited

U.S. PATENT DOCUMENTS

| | | | | |
|---|---|---|---|---|
| 5,046,754 A | * | 9/1991 | Kimura | B60G 17/017 280/6.152 |
| 6,098,995 A | * | 8/2000 | Danis | B60G 17/017 280/124.179 |
| 11,059,340 B2 | * | 7/2021 | Bianco | B60G 7/008 |

(Continued)

FOREIGN PATENT DOCUMENTS

DE  102013205370 B4 * 12/2021 ......... B60G 17/0157

*Primary Examiner* — Toan C To
(74) *Attorney, Agent, or Firm* — Schmeiser, Olsen & Watts LLP

(57) ABSTRACT

Described are devices, systems, and methods that enable greater control and customization of variable suspension systems via mechanical modification, among other advantages. In one example, a linkage device is configured to be attached to a suspension arm of a vehicle and to a vehicle frame of the vehicle. The linkage device is configured to mechanically modify one or more physical states detected by a sensor of the vehicle, thereby causing the sensor to output modified signals to a controller, and causing the controller to output modified control signals to a variable shock absorber connected between the vehicle frame and the suspension arm, thereby modifying one or more variable physical properties of the variable shock absorber.

20 Claims, 4 Drawing Sheets

(56) References Cited

U.S. PATENT DOCUMENTS

| | | | |
|---|---|---|---|
| 2008/0193207 A1* | 8/2008 | Kruse | G01M 3/26 |
| | | | 700/13 |
| 2009/0051135 A1* | 2/2009 | Lohmuller | B62D 15/021 |
| | | | 280/124.1 |
| 2017/0267048 A1* | 9/2017 | Kubota | B60G 17/0165 |
| 2020/0198430 A1* | 6/2020 | Bianco | B60G 17/08 |
| 2020/0238781 A1* | 7/2020 | Hadi | B60G 17/0152 |
| 2021/0008947 A1* | 1/2021 | Glas | B60G 17/015 |
| 2021/0276386 A1* | 9/2021 | Verbowski | B60G 17/019 |

* cited by examiner

MODIFIED CONTROL OF VARIABLE SHOCK ABSORBERS

CROSS REFERENCE TO RELATED APPLICATION(S)

This application claims priority to U.S. Provisional Patent Application to Justin Smith entitled "MODIFIED CONTROL OF VARIABLE SHOCK ABSORBERS," Ser. No. 63/161,071, filed Mar. 15, 2021, the disclosure of which is hereby incorporated entirely herein by reference.

BACKGROUND OF THE INVENTION

Technical Field

This disclosure relates to ground vehicle suspension systems, and in particular to modifying control of ground vehicle suspension systems and shock absorbers.

State of the Art

Off-road vehicles, such as utility task vehicles (UTVs), side-by-side vehicles (SXSs), all-terrain vehicles (ATVs), and snowmobiles, are typically driven over a wide variety of terrains with a wide range of ground characteristics, from smooth pavement or snow to extremely rugged trails and uneven, rocky cross-country terrain. Providing suspension systems appropriate for the performance requirements of off-road vehicles, intended for a wide variety of terrain types and use cases, involves challenging optimization across competing engineering priorities, and has been an active area of research and development. The suspension system must stably support the weight of the vehicle above each wheel or other ground contact component (e.g., track or ski) including when the wheels or ground contact components are jumping off of and rebounding against the ground during travel over bumpy or uneven terrain, sometimes at high speeds. The suspension system should also maintain contact of the wheel or other ground contact component with the ground as much as possible, to maximize control of the vehicle; should promote good handling of the vehicle; and should provide a comfortable ride.

The trade-offs between optimizing for all of these largely conflicting priorities are very different depending on use case or riding conditions, e.g. ruggedness of terrain and vehicle speed. To help address optimizing among these trade-offs in suspension characteristics between different use cases or riding conditions, off-road vehicles can be made or outfitted with variable suspension systems that include variable shock absorbers. Variable suspension systems may enable the shock stiffness of their shock absorbers to be altered in response to one or more inputs or conditions. Variable suspension systems may provide more or less shock stiffness to be responsive and accommodating to different types of terrain, use cases, or user preferences.

A suspension system may include one or more sensors and an electronic controller. The sensors may detect inputs indicative of physical variables, such as ride height and/or suspension speed, and communicate data based on those indicated variables to the controller. The controller may then determine changes in shock stiffness based on those indicated variables, and output control signals indicating those changes in shock stiffness to the variable shock absorbers. There may be individual sensors for each wheel or other ground contact component, and the controller may control variations to the shock stiffness of the shock absorbers for each wheel or other ground contact component individually.

Variable shock absorbers are useful for adapting the shock stiffness, handling qualities, and ride experience to different terrain types, speeds, use cases, and user preferences. It nonetheless remains challenging to optimize among competing performance characteristics over the broad range of operation scenarios for off-road vehicles.

SUMMARY

This disclosure is directed to devices, systems, and methods that enable greater control and customization of variable suspension systems via mechanical modification, among other advantages. Given the shortcomings and limitations of existing variable suspension systems, there remains a need to better provide options for good ride quality and comfort in combination with other performance factors, which may be fulfilled by embodiments of this disclosure. Various embodiments of this disclosure may enable mechanical control and customization of shock stiffness properties of variable suspension systems, without needing to modify the electronic controllers, sensors, or other electronic components of such .variable suspension systems. Devices, systems, and methods of this disclosure may enable one or more linkage components of a variable suspension system to be mechanically modified in ways that deliver targeted mechanical modifications to the physical inputs indicative of status variables, such as ride height and suspension speed, detected by variable suspension system sensors. These mechanical modifications to the linkage may thereby systematically modify the sensor readings received by the controller, and the variable suspension control signals delivered by the controller to the variable shock absorbers, without requiring any modification of the vehicle's controller or electronic systems.

For example, a novel linkage device of this disclosure may be installed between the vehicle frame and one of the suspension arms, in such a way that modifies the inputs detected by a sensor. The sensor may be disposed on the vehicle frame at a position adjacent an attachment point of the linage device to the vehicle frame. The linkage device may relocate pivot points of the wheel linkage arm relative to the vehicle frame, in comparison with existing systems that the sensor may be designed around, where such relocated pivot point geometry of the wheel linkage arm relative to the vehicle frame may modify states detected by the sensor indicative of properties of the vehicle's motion. This relocated pivot point geometry of the wheel linkage arm relative to the vehicle frame by the linkage device may thus cause modification of the resulting signals communicated by the sensor to the controller, and thereby modification of the control signals outputted by the controller to the variable shock absorbers, such as to reduce the damping of the shocks, thereby keeping the shock absorbers softer and improving ride quality. Thus, embodiments of this disclosure encompass mechanical modifications of a vehicle's linkage in ways that translate to desired modifications to suspension system behavior and handling properties of the vehicle, such as to provide superior ride quality and ride comfort, without needing to modify the programming of the electronic controller or any other aspect of the electronic systems.

In one example, a linkage device is configured to be attached to a suspension arm of a vehicle and to a vehicle frame of the vehicle. The linkage device is configured to mechanically modify one or more physical states detected by a sensor of the vehicle, thereby causing the sensor to output modified signals to a controller, and causing the controller to output modified control signals to a variable shock absorber connected between the vehicle frame and the suspension arm, thereby modifying one or more variable physical properties of the variable shock absorber.

In another example, a vehicle includes a vehicle frame, and a suspension assembly connected to the vehicle frame by both a suspension arm and a shock absorber assembly. The shock absorber assembly comprises a variable shock absorber, and a spring disposed around the variable shock absorber. The suspension assembly is configured to have a wheel mounted thereon. The vehicle further includes a controller, configured to be communicatively coupled to the variable shock absorber and to output control signals to the variable shock absorber to vary a shock stiffness of the variable shock absorber. The vehicle further includes a sensor, configured to detect physical inputs via the suspension arm, and to output one or more sensor signals to the controller based at least in part on the detected physical inputs, wherein the controller is configured to output the control signals based at least in part on the sensor signals from the sensor. The vehicle further includes a linkage device, coupled to the suspension assembly and the vehicle frame. The linkage device is configured to mechanically modify the physical inputs detected by the sensor, thereby modifying the control signals outputted by the controller to the variable shock absorber, and thereby modifying the shock stiffness of the variable shock absorber.

In another example, a method includes providing a vehicle comprising: a vehicle frame; a sensor; a controller; and a suspension assembly coupled to the vehicle frame, wherein the suspension assembly comprises a suspension arm and a variable shock absorber. The sensor is configured to detect physical inputs, and to output a sensor signal based on the detected physical inputs to the controller, and wherein the controller is configured to receive the sensor signal from the sensor and to output a control signal to the variable shock absorber, based at least in part on the sensor signal, wherein the control signal is configured to vary a shock stiffness of the variable shock absorber. The method further includes providing a linkage device attached between the vehicle frame and the suspension arm, wherein the linkage device is configured to modify the physical inputs detected by the sensor, such that the sensor outputs, to the controller, a modified sensor signal based on the modified detected physical inputs, and such that the controller outputs, to the variable shock absorber, a modified control signal based at least in part on the modified sensor signal, wherein the modified control signal modifies a characteristic of the variable shock absorber.

Further embodiments include additional devices, vehicles, systems, and methods. The details of one or more examples are set forth in the accompanying drawings and the description below. Other features, objects, and advantages will be apparent from the description and drawings, and from the claims.

DETAILED DESCRIPTION

Various examples described herein may be directed to devices, systems, and methods that enable greater control and customization of variable suspension systems via mechanical modification, among other advantages. In particular, various examples disclosed herein may implement novel linkage device, such as a dual linkage device comprising two rotatably coupled linkage device components, that may be used as a novel linkage between a vehicle body and a suspension component such as a component arm. Implementing a linkage device as disclosed herein may provide for greater ride comfort and ride quality of an off-road vehicle, among other advantages.

Figure 1:
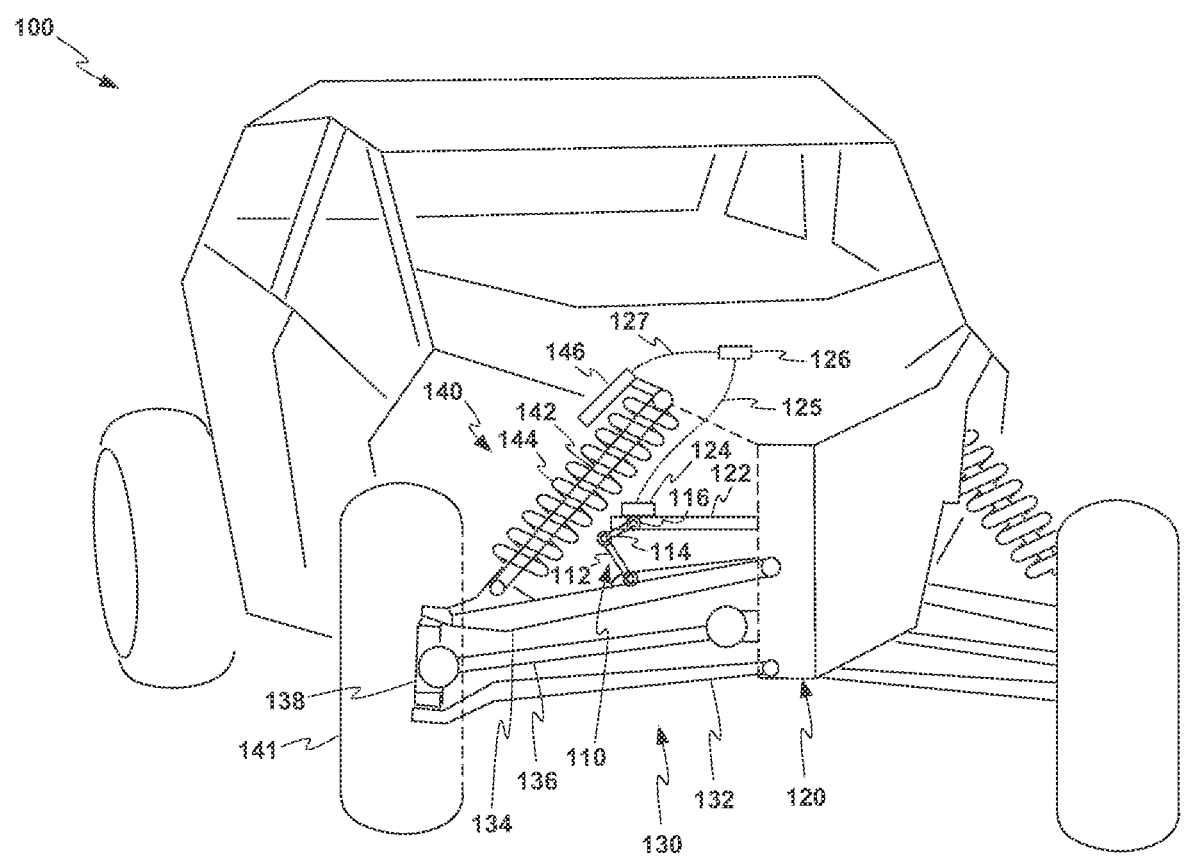
FIG. 1 is a simplified, conceptual, partially cutaway, front perspective view diagram of an example vehicle implemented with a linkage device of the present disclosure.

FIG. 1 is a simplified, conceptual, partially cutaway, front perspective view diagram of an example vehicle 100 implemented with a linkage device 110 of the present disclosure. Vehicle 100 may be an off-road vehicle such as a utility task vehicle (UTV), a side-by-side vehicle (SXS), or an all-terrain vehicle (ATV), as some illustrative examples. Vehicle 100 includes a vehicle frame 120 and a suspension system 130. Suspension system 130 includes a lower arm 132, an upper arm 134, a tie rod 136, and a shock absorber assembly 140, all rotatably mounted between vehicle frame 120 and wheel carrier 138. Lower arm 132 and upper arm 134 may be A-arms, in some examples, which have a generally "A"-shaped frame (here seen edge-on). Wheel carrier has wheel 141 mounted thereon. Shock absorber assembly 140 includes a variable shock absorber 142 surrounded by a coil spring 144. Coil spring 144 may include two or more coil springs in series, in some examples. Variable shock absorber 142 and coil spring 144 are thus rotatably mounted between vehicle frame 120 and wheel carrier 138.

In this example, linkage device 110 includes a lower linkage component 112 and an upper linkage component 114, rotatably coupled to each other at an inner rotatable coupling of linkage device 110. Lower linkage component 112 is configured to be attached to suspension system 130, and upper linkage component 114 is configured to be attached to vehicle frame 120. Specifically, in this example, linkage device 110 is rotatably coupled between upper arm 134 and linkage mount 122, which is part of vehicle frame 120. Lower linkage component 112 is rotatably coupled at a distal end thereof to upper arm 134 of suspension system 130, at an intermediate position thereof. Upper linkage component 114 is rotatably coupled at a distal end thereof to linkage mount 122 of vehicle frame 120, at rotatable attachment coupling 116.

Linkage device 110 is configured to mechanically modify one or more physical states detected by a sensor 124, thereby causing sensor 124 to output modified signals to an electronic controller 126. Controller 126 is conceptually depicted at a given position within vehicle 100, but may be located anywhere in vehicle 100. Sensor 124 is mounted on linkage mount 122, and is configured to detect physical states of rotatable attachment coupling 116. For example, in various examples, sensor 124 may detect an angle at which upper linkage component 114 is coupled to linkage mount 122, an angular speed and direction with which upper linkage component 114 is rotating about attachment coupling 116, or a strain between upper linkage component 114 and linkage mount 122 at attachment coupling 116. Sensor 124 is communicatively connected to controller 126 via a signal channel 125 (e.g., an analog copper wire, a fiberoptic cable, a Bluetooth connection), and outputs signals indicative of the physical states it detects to controller 126. Thus, by mechanically modifying one or more physical states detected by sensor 124, linkage device 110 also thereby causes sensor 124 to output modified signals to controller 126.

Controller 126 is communicatively coupled to variable shock absorber 142 via signal channel 127. Controller 126 is configured to determine control signals based at least in part on signals from sensor 124, and to output the control signals to variable shock absorber 142, which have the effect of varying the variable physical properties of variable shock absorber 142, such as damping stiffness. Thus, linkage device 110 also causes controller 126 to output modified control signals to variable shock absorber 142, thereby modifying one or more physical properties of variable shock absorber 142, such as its damping stiffness.

For example, variable shock absorber 142 may include variable orifice valves in its cylinder walls, with fluid connections with an oil reservoir 146 that may be mounted side-by-side and in parallel with variable shock absorber 142. Controller 126 may exert frequent, rapid inflows and outflows of shock absorber oil between the interior of variable shock absorber 142 and oil reservoir 146. Controller 126 may thus rapidly vary the shock stiffness or damping of variable shock absorber 142 to any damping level between a maximum damping level and a minimum damping level, or any damping stiffness in between. Linkage device 110 may thus also modify how controller 126 controls a wide range of driving and handling characteristics in combination with other inputs to controller 126, such as maintaining contact of the wheels or other ground engaging members with the ground, controlling attitude during acceleration and deceleration, controlling sway during turns, for example.

Figure 2:
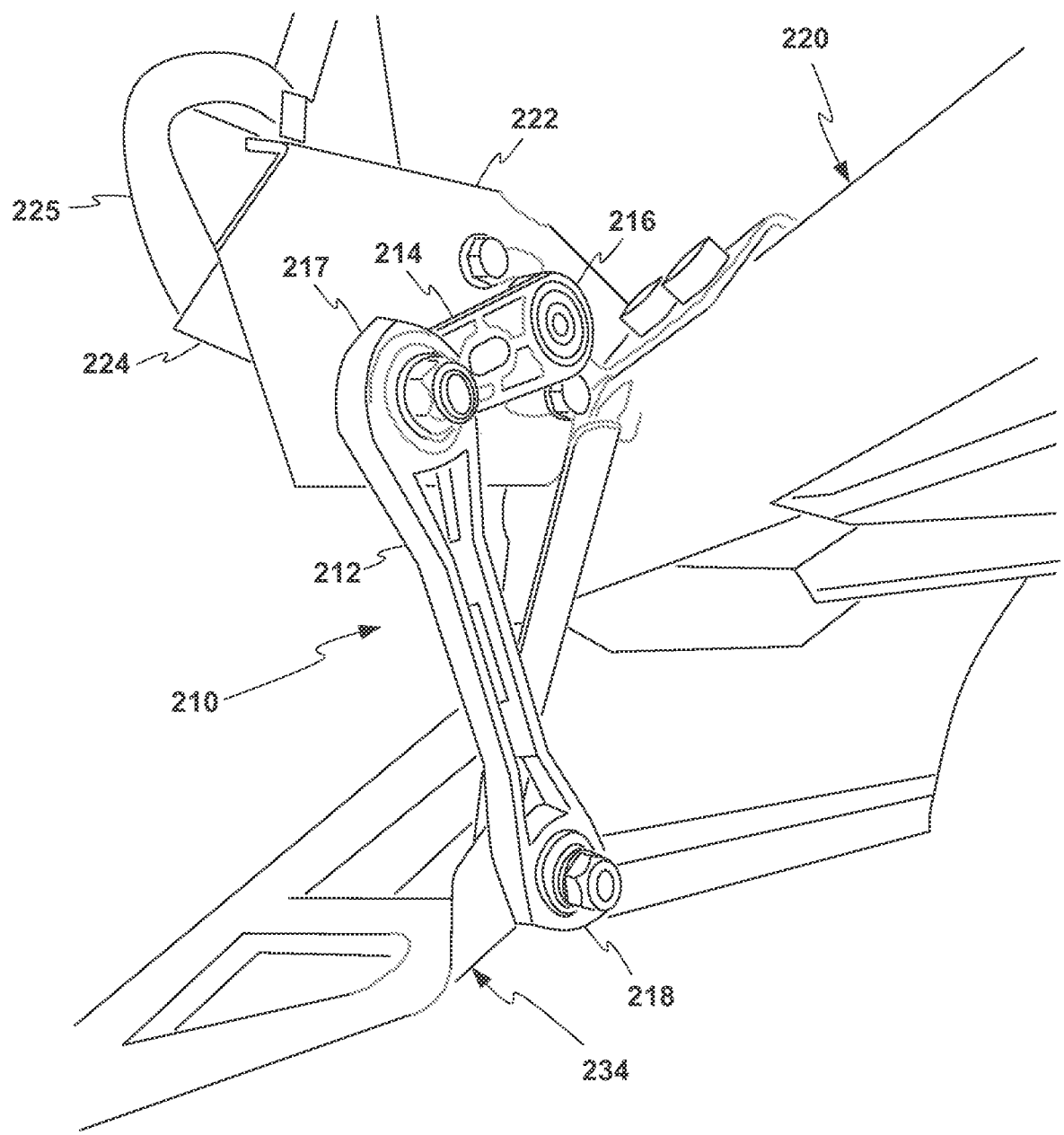
FIG. 2 is a perspective view detail diagram of an example linkage device in context within a suspension system for one of the wheels or other ground engaging members of a vehicle, in another illustrative example.

FIG. 2 is a perspective view detail diagram of an example linkage device 210 in context within a suspension system for one of the wheels or other ground engaging members of a vehicle, in another illustrative example. Linkage device 210 includes a lower linkage component 212 and an upper linkage component 214, rotatably coupled to each other at an inner rotatable coupling 217 of linkage device 210. Upper linkage component 214 is rotatably coupled to linkage mount 222 of vehicle frame 220 at rotatable coupling 216, and lower linkage component 212 is rotatably coupled to upper A-arm 234 at rotatable coupling 218. A-arm 234 is one illustrative example of a suspension arm.

Sensor 224 is mounted on an opposing side of linkage mount 222 from upper linkage component 214 (behind the intermediary wall of linkage mount 222 in the perspective view of FIG. 2), and is configured to detect physical states of upper linkage component 214 and its coupling to linkage mount 222 at rotatable coupling 218, e.g., physical states such as angle of coupling, angular speed and direction of a rotation of upper linkage component 214 about rotatable coupling 218, and/or linear or angular strain between linkage component 214 and linkage mount 222 about rotatable coupling 218, among other examples. Sensor 224 is connected to electrical cord 225 which acts as a signal channel to a controller (not shown in FIG. 2) and conveys sensor signals from sensor 224 to the controller.

In the manner as shown in FIG. 2, linkage device 210 provides a novel, modified pivot geometry for a linkage between vehicle frame 220 and upper A-arm 234, and of a suspension system of which upper A-arm 234 is a part. This modified pivot geometry provided by linkage device 210 modifies the behavior of the variable shock absorber (not shown in FIG. 2) that operates on the wheel or other ground engaging member mounted on the suspension system of which a detailed part is depicted in FIG. 2.

For example, linkage device 210 may systematically bias a controller to exert softer damping on a variable shock absorber included in the same suspension system as that in which linkage device 210 is mounted. This may be particularly useful, for example, as an after-market modification in a vehicle in which the mechanical suspension system tends to be too stiff and to provide too harsh of a ride quality. In other examples, linkage device 210 may be incorporated as part of an original manufacturer's design of a vehicle, and may be particularly useful as a novel suspension system element to help provide excellent ride quality in combination with other suspension and mechanical system components as part of the overall suspension design.

Figure 3:
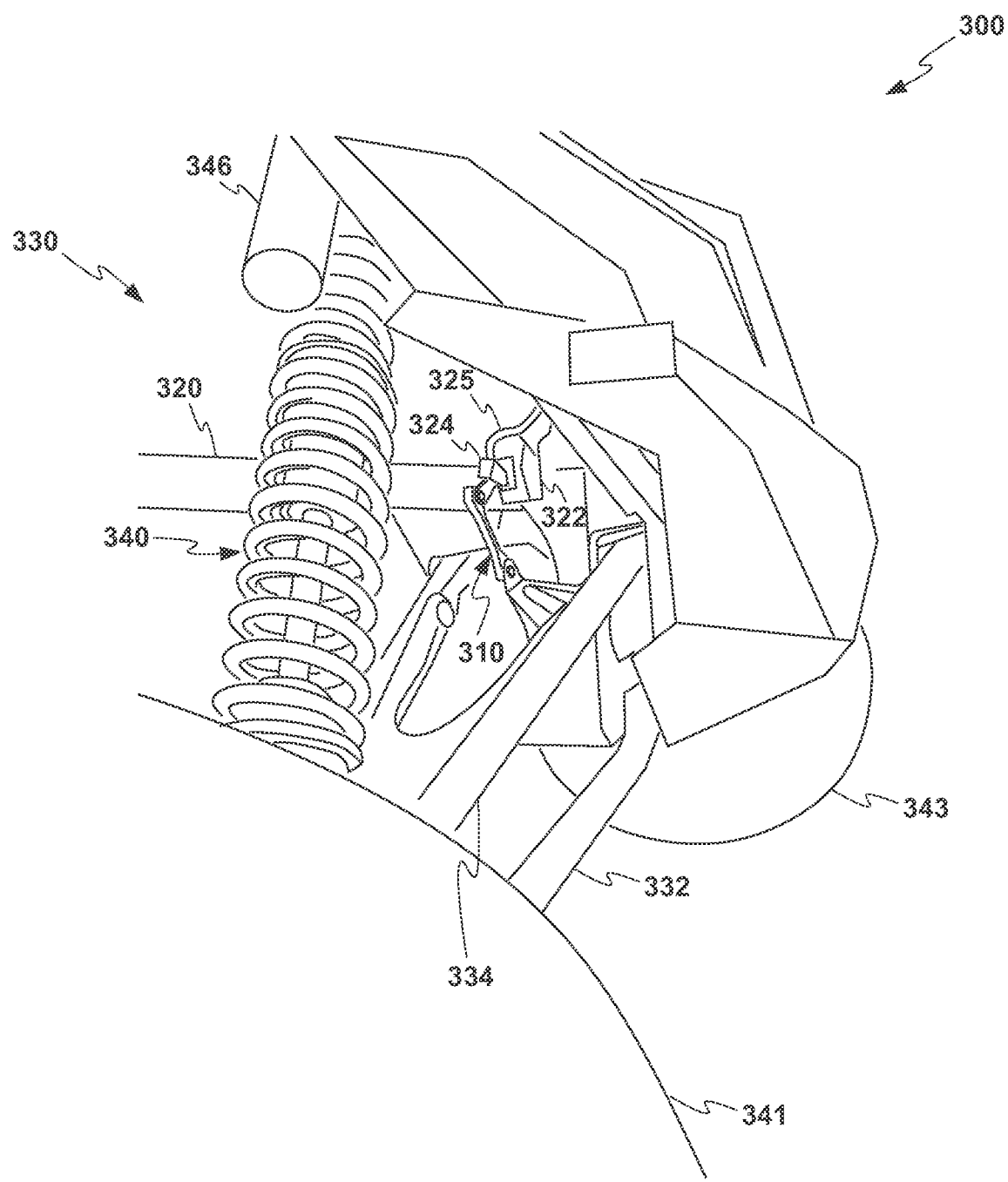
FIG. 3 is a perspective view detail diagram of an example vehicle suspension system incorporating a linkage device for a front right-hand side wheel of a vehicle, in another illustrative example, and showing detail from a different perspective.

FIG. 3 is a perspective view detail diagram of an example vehicle suspension system 330 incorporating a linkage device 310 for a front right-hand side wheel 341 of a vehicle 300, in another illustrative example, and showing detail from a different perspective. Wheel 341 is mounted to vehicle 300 via lower A-arm 332, upper A-arm 334, and shock absorber assembly 340 (and may also have a tie rod connected thereto, not shown in the view of FIG. 3). Shock absorber assembly 340 includes a variable shock absorber surrounded by two stacked serial coil springs, and has an oil reservoir 346 mounted adjacent thereto, as shown.

Linkage device 310 includes a lower linkage component and an upper linkage component, rotatably coupled to each other at an inner rotatable coupling. The upper linkage component of linkage device 310 is rotatably coupled to linkage mount 322 of vehicle frame 320. The lower linkage component of linkage device 310 is rotatably coupled to upper A-arm 334. Sensor 324 is mounted on linkage mount 322 adjacent linkage device 310, and is configured to detect physical states (e.g., angle of coupling, angular speed, and direction of rotation) of linkage device 310 relative to linkage mount 322. Sensor 324 is connected to electrical cord 325 which acts as a signal channel to a controller (not shown in FIG. 3) and conveys sensor signals from sensor 324 to the controller.

The controller is communicatively coupled to shock absorber assembly 340, and outputs control signals to the variable shock absorber, based at least in part on sensor signals it receives from sensor 324. The controller may also receive signals from any number of other sources, such as sensors mounted on the suspension systems of front left-hand wheel 343 and other wheels of the vehicle, and other sensors and data sources that may communicate signals indicative of the vehicle's speed, acceleration and deceleration, turn radius, pitch, roll, yaw, wheel contact with the ground, and/or any states of potential interest in controlling damping stiffness of shock absorber assembly 340 and any controllable aspect of vehicle 300.

In some examples, linkage device 310 may systematically modify the physical states detected by sensor 324 indicative of the performance and ongoing status of suspension system 330 for wheel 341 in such a way as to consistently cause the controller to reduce the damping stiffness of shock absorber assembly 340 relative to prior art systems. A parallel linkage device on the front left-hand suspension for wheel 343 may similarly perform the same role for that suspension.

In some examples, such a modification to detected physical states of suspension system 300 by sensor 324 may include linkage device 310 causing a delay of signals indicative of ground impacts and other vertical acceleration shocks to the controller, such that the controller has a delayed reaction in raising the damping stiffness of shock absorber assembly 340, and overall reduces the damping stiffness to shock absorber assembly 340, relative to prior art systems or to a comparable suspension system without linkage device 310. Linkage device 310 may thus cause the controller to induce vehicle 300 to employ its variable shock absorbers to deliver a consistently softer and more comfortable ride, compared to prior art systems or to a comparable suspension system without linkage device 310, and by mechanical means without any needed modification to the controller or otherwise to the electronic systems of vehicle 300. Further, in some examples, the mechanical properties of linkage device 310 enable it to moderate vertical accelerations and help soften ride quality inherently to its mechanical properties, in combination with the total mechanical properties of suspension system 330.

In some examples, linkage device 310 may mechanically modify one or more physical inputs to sensor 324 that the sensor is configured to interpret, at least in part, as indicative of a ride height of vehicle 300. In this example, linkage device 310 causes sensor 324 to output a modified ride height signal to the controller, causing the controller to output a control signal based on a modified ride height to the variable shock absorber of shock absorber assembly 340. In some examples, linkage device 310 may mechanically modify one or more physical inputs to the sensor that the sensor is configured to interpret, at least in part, as indicative of a shaft speed of a shock absorber shaft of the variable shock absorber of shock absorber assembly 340. In this example, linkage device 310 causes sensor 324 to output a modified shaft speed signal to the controller, causing the controller to output a control signal based on a modified shaft speed to the variable shock absorber of shock absorber assembly 340.

Figure 4:
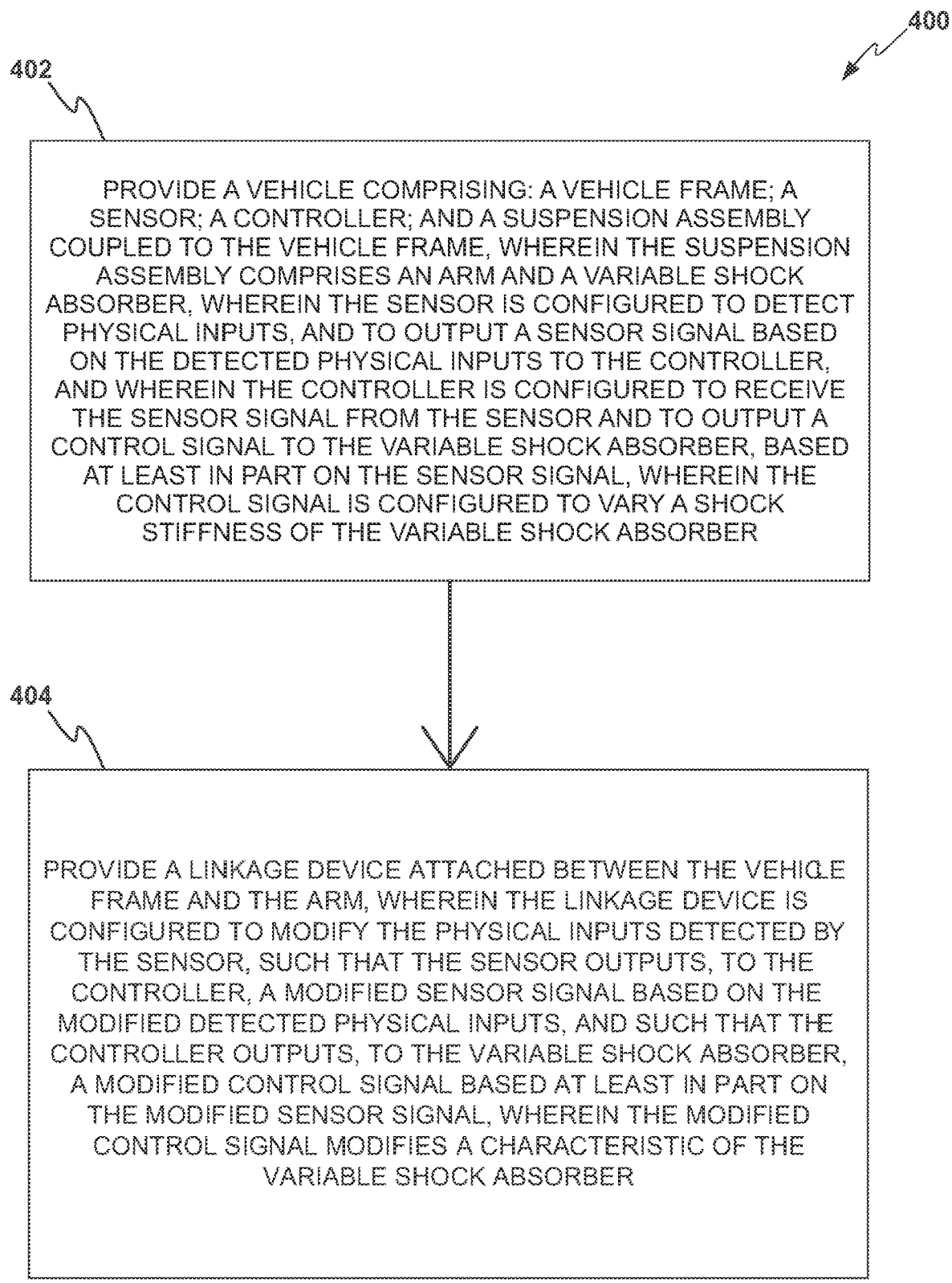
FIG. 4 is a simple flowchart of a method 400 in accordance with another illustrative embodiment of this disclosure.

FIG. 4 is a simple flowchart of a method 400 of the present disclosure. Method 400 includes providing a vehicle comprising: a vehicle frame; a sensor; a controller; and a suspension assembly coupled to the vehicle frame, wherein the suspension assembly comprises an arm and a variable shock absorber, wherein the sensor is configured to detect physical inputs, and to output a sensor signal based on the detected physical inputs to the controller, and wherein the controller is configured to receive the sensor signal from the sensor and to output a control signal to the variable shock absorber, based at least in part on the sensor signal, wherein the control signal is configured to vary a shock stiffness of the variable shock absorber 402. Method 400 further includes providing a linkage device attached between the vehicle frame and the arm, wherein the linkage device is configured to modify the physical inputs detected by the sensor, such that the sensor outputs, to the controller, a modified sensor signal based on the modified detected physical inputs, and such that the controller outputs, to the variable shock absorber, a modified control signal based at least in part on the modified sensor signal, wherein the modified control signal modifies a characteristic of the variable shock absorber 404.

While some examples described above and depicted in the figures are directed to certain particulars of a ground-based vehicle, other embodiments of this disclosure may be directed to any of a wide variety of vehicles, suspension systems, and other systems, suitable for any terrain or use case The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

What is claimed is:

1. A linkage device, configured to be attached to a suspension arm of a vehicle and to a vehicle frame of the vehicle, wherein the linkage device is configured to mechanically modify one or more physical inputs detected by a sensor of the vehicle, thereby causing the sensor to output modified signals to a controller, and causing the controller to output modified control signals to a variable shock absorber connected between the vehicle frame and the suspension arm, thereby modifying one or more variable physical properties of the variable shock absorber.

2. The linkage device of claim 1, wherein the linkage device comprises:
a first linkage component, and
a second linkage component, rotatably coupled to the first linkage component,
wherein the first linkage component is configured to be rotatably coupled to the suspension arm, and the second linkage component is configured to be rotatably coupled to the vehicle frame.

3. The linkage device of claim 2, wherein the sensor is disposed on the vehicle frame adjacent to an attachment point of the second linkage component of the linkage device to the vehicle frame, such that the linkage device is configured to transmit the mechanically modified one or more physical inputs to the sensor via the attachment point of the second linkage of the linkage device to the vehicle frame.

4. The linkage device of claim 1, wherein the linkage device is configured to relocate one or more pivot points of the suspension assembly relative to the vehicle frame, thereby mechanically modifying the one or more physical inputs detected by the sensor.

5. The linkage device of claim 1, wherein the one or more physical inputs the linkage device is configured to mechanically modify comprises at least one of the one or more physical inputs to the sensor that the sensor is configured to interpret as indicative of a ride height of the vehicle, such that the linkage device causes the sensor to output a modified ride height signal to the controller, causing the controller to output a control signal based on a modified ride height to the variable shock absorber.

6. The linkage device of claim 1, wherein the one or more physical inputs the linkage device is configured to mechanically modify comprises at least one of the one or more physical inputs to the sensor that the sensor is configured to interpret as indicative of a shaft speed of a shock absorber shaft of the variable shock absorber, such that the linkage device causes the sensor to output a modified shaft speed signal to the controller, causing the controller to output a control signal based on a modified shaft speed to the variable shock absorber.

7. The linkage device of claim 1, wherein the linkage device is configured to modify the one or more physical inputs to the sensor that the sensor is configured to interpret as indicative of ride height of the vehicle, such that the linkage device causes the sensor to output a modified ride height signal to the controller.

8. The linkage device of claim 1, wherein the linkage device is configured to modify an attachment angle of the linkage device to the vehicle frame as detected by the sensor.

9. The linkage device of claim 1, wherein the linkage device is configured to modify a rotational strain of the linkage device to the vehicle frame as detected by the sensor.

10. The linkage device of claim 1, wherein the linkage device is configured to modify a linear strain of the linkage device to the vehicle frame as detected by the sensor.

11. The linkage device of claim 1, wherein the linkage device is configured to mechanically modify the one or more physical inputs detected by the sensor such that the controller outputs the modified control signals to the variable shock absorber to reduce a damping of the variable shock absorber, resulting in a softer ride quality.

12. The linkage device of claim 1, wherein the linkage device is configured to cause a delay in the sensor outputting signals to the controller relative to a physical status of the variable shock absorber, thereby causing the controller to output the modified control signals to the variable shock absorber to reduce a damping of the variable shock absorber, resulting in a softer ride quality.

13. A vehicle comprising:
a vehicle frame;
a suspension assembly connected to the vehicle frame by both a suspension arm and a shock absorber assembly, wherein the shock absorber assembly comprises a variable shock absorber, and a spring disposed around the variable shock absorber, and wherein the suspension assembly is configured to have a wheel mounted thereon;
a controller configured to be communicatively coupled to the variable shock absorber and to output control signals to the variable shock absorber to vary a shock stiffness of the variable shock absorber;
a sensor configured to detect physical inputs via the suspension arm, and to output one or more sensor signals to the controller based at least in part on the detected physical inputs, wherein the controller is configured to output the control signals based at least in part on the one or more sensor signals from the sensor; and
a linkage device, coupled to the suspension assembly and the vehicle frame, wherein the linkage device is configured to mechanically modify the physical inputs detected by the sensor, thereby modifying the control signals outputted by the controller to the variable shock absorber, and thereby modifying shock stiffness of the variable shock absorber.

14. The vehicle of claim 13, wherein the linkage device is configured to mechanically modify a configuration of the suspension assembly such that it causes the controller to output the control signals to the variable shock absorber to reduce the shock stiffness, relative to the shock stiffness unmechanically modified.

15. The vehicle of claim 13, wherein the sensor is configured to output to the controller, based at least in part on the detected physical inputs, an output indicative of a shaft speed of the variable shock absorber, and the linkage device is configured to cause the sensor to detect a reduced shaft speed, relative to a shaft speed the sensor would detect in the absence of the linkage device.

16. The vehicle of claim 13, wherein the sensor is configured to output to the controller, based at least in part on the detected physical inputs, an output indicative of a ride height of the vehicle, and the linkage device is configured to cause the sensor to detect a reduced ride height, relative to a ride height the sensor would detect in the absence of the linkage device.

17. A method comprising:
providing a vehicle comprising: a vehicle frame; a sensor; a controller; and a suspension assembly coupled to the vehicle frame, wherein the suspension assembly comprises a suspension arm and a variable shock absorber, wherein the sensor is configured to detect physical inputs, and to output a sensor signal based on the detected physical inputs to the controller, and wherein the controller is configured to receive the sensor signal from the sensor and to output a control signal to the variable shock absorber, based at least in part on the sensor signal, wherein the control signal is configured to vary a shock stiffness of the variable shock absorber; and
providing a linkage device attached between the vehicle frame and the suspension arm, wherein the linkage device is configured to modify the physical inputs detected by the sensor, such that the sensor outputs, to the controller, a modified sensor signal based on the modified detected physical inputs, and such that the controller outputs, to the variable shock absorber, a modified control signal based at least in part on the modified sensor signal, wherein the modified control signal modifies a characteristic of the variable shock absorber.

18. The method of claim 17, further comprising: configuring the linkage device to relocate one or more pivot points of the suspension assembly relative to the vehicle frame, thereby causing a delay in the sensor outputting the sensor signals to the controller relative to a physical status of the variable shock absorber, thereby causing the controller to output the modified control signals to the variable shock absorber to reduce a damping of the variable shock absorber, resulting in a softer ride quality.

19. The method of claim 17, further comprising: configuring the linkage device to mechanically modify one or more physical inputs to the sensor that the sensor is configured to interpret as indicative of a ride height of the vehicle, such that the linkage device causes the sensor to output a modified ride height signal to the controller, causing the controller to output the control signal based on a modified ride height to the variable shock absorber.

20. The method of claim 17, further comprising: configuring the linkage device to mechanically modify one or more physical inputs to the sensor that the sensor is configured to interpret as indicative of a shaft speed of a shock absorber shaft of the variable shock absorber, such that the linkage device causes the sensor to output a modified shaft speed signal to the controller, causing the controller to output the control signal based on a modified shaft speed to the variable shock absorber.

* * * * *